United States Patent [19]

Heimark, Jr. et al.

[11] Patent Number: 4,538,404
[45] Date of Patent: Sep. 3, 1985

[54] ADJUSTABLE CROP DIVIDER APPARATUS

[75] Inventors: Charles J. Heimark, Jr.; Charles J. Heimark, Sr., both of Clarkfield, Minn.

[73] Assignee: General Dryer Corporation, Clarkfield, Minn.

[21] Appl. No.: 523,718

[22] Filed: Aug. 16, 1983

[51] Int. Cl.³ ............................................ A01D 45/00
[52] U.S. Cl. ...................................... 56/314; 56/119; 56/126
[58] Field of Search ................... 56/98, 119, 314, 126, 56/320.1

[56] References Cited

U.S. PATENT DOCUMENTS

| | | |
|---|---|---|
| 1,379,112 | 5/1921 | Luedke . |
| 2,053,741 | 9/1936 | Rousch ............................ 56/314 |
| 2,534,481 | 12/1950 | Spraker ........................... 56/119 |
| 2,641,888 | 6/1953 | Grether ............................. 56/19 |
| 2,867,961 | 1/1959 | Heilbrun ......................... 56/119 |
| 3,214,894 | 11/1965 | Whitman .......................... 56/119 |
| 3,271,940 | 9/1966 | Ashton et al. .................... 56/119 |
| 3,496,708 | 2/1970 | Bornzin ........................... 56/119 |
| 3,722,193 | 3/1973 | Strubbe ............................ 56/208 |
| 4,084,396 | 4/1978 | Fritz et al. ........................ 56/98 |
| 4,214,422 | 7/1980 | McMillen ........................ 56/119 |
| 4,255,920 | 3/1981 | Janzen ............................. 56/126 |
| 4,403,467 | 9/1983 | Baugh .............................. 56/98 |

Primary Examiner—Gene Mancene
Assistant Examiner—David L. Tarnoff
Attorney, Agent, or Firm—Merchant, Gould, Smith, Edell, Welter & Schmidt

[57] ABSTRACT

An improved crop divider assembly (14) for crop harvesting equipment is disclosed. A preferred embodiment of the invention is a combine attachment (12) for operative engagement with a combine (10). The combine attachment (12) includes a plurality of crop divider assemblies (14) that form a plurality of slots which guide the crop into the combine (10) as the combine (10) progresses through the field. The widths of crop divider assemblies (14) are adjustable, thereby making the widths of the slots adjustable. Each of the crop divider assemblies (14) also preferably includes a hingedly-connected snout (16). Each snout (16) is vertically adjustable to permit adjustment of the minimum included angle (31) formed by a pan longitudinal axis (30) and snout longitudinal axis (32). Each snout preferably includes a shoe (18) at its forward end, the shoes (18) upwardly deflecting the snouts (16) if uneven soil, for example, is encountered during the forward progression of the combine (10).

12 Claims, 6 Drawing Figures

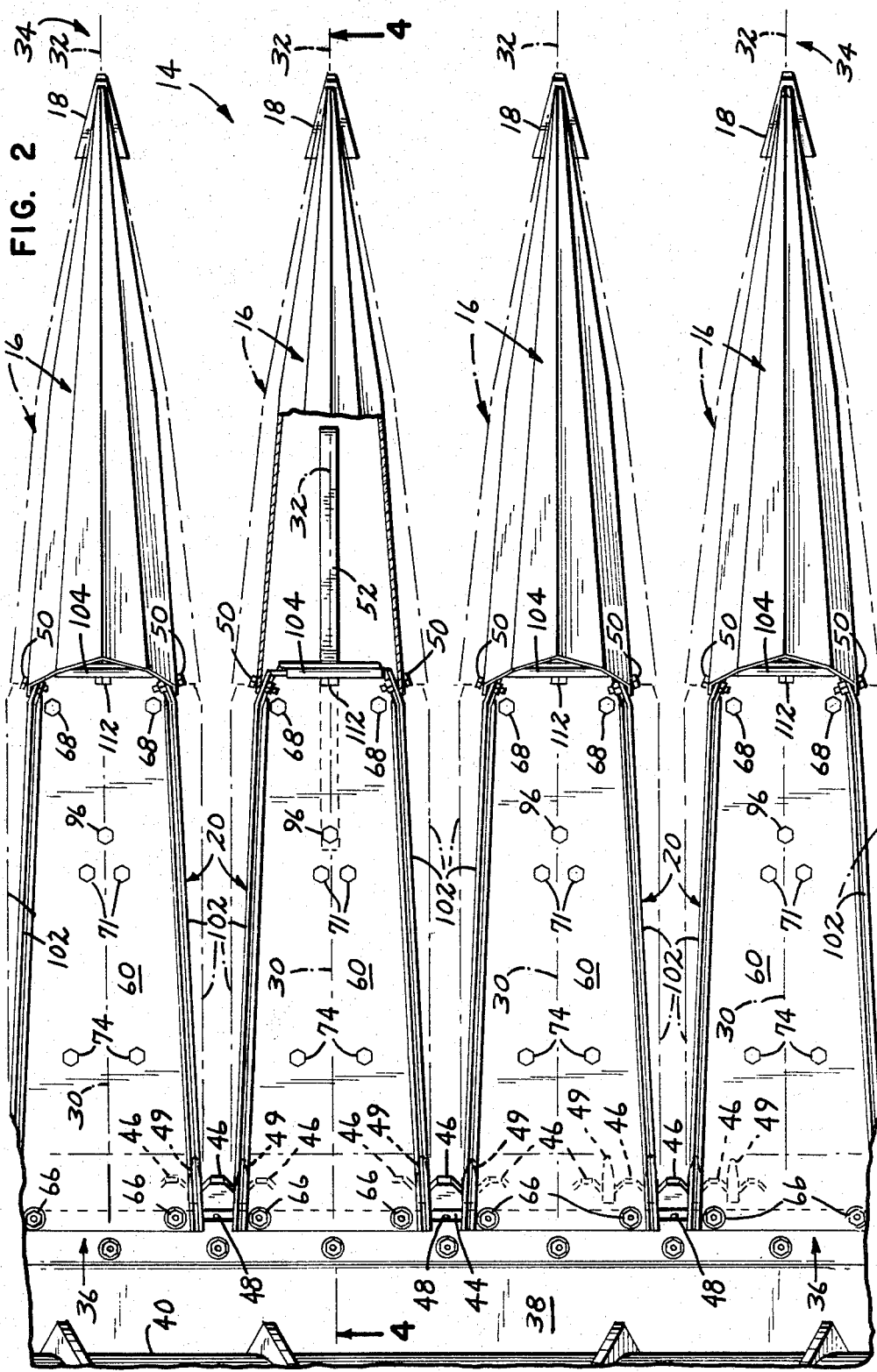

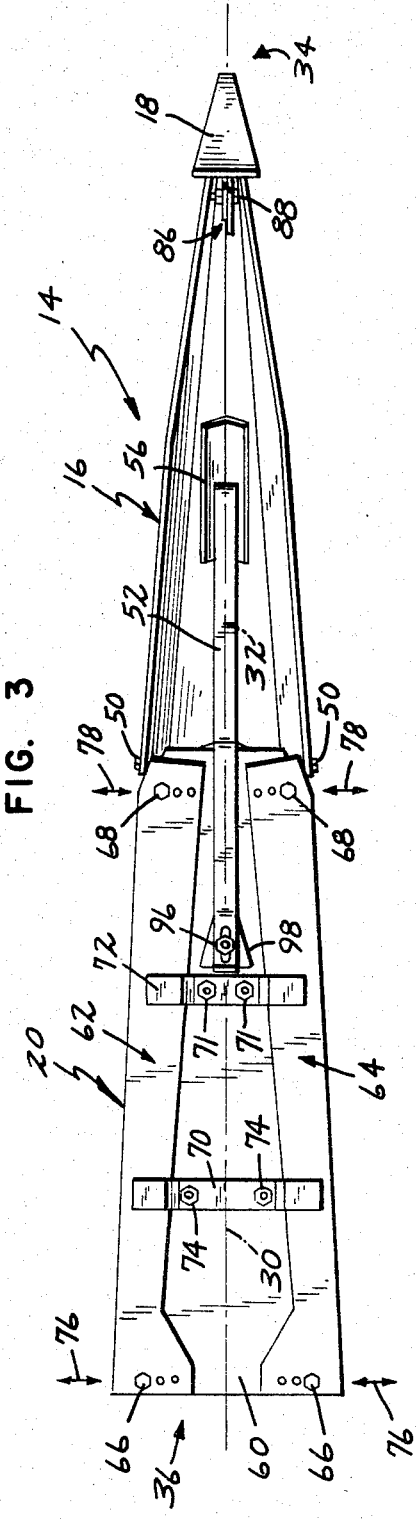
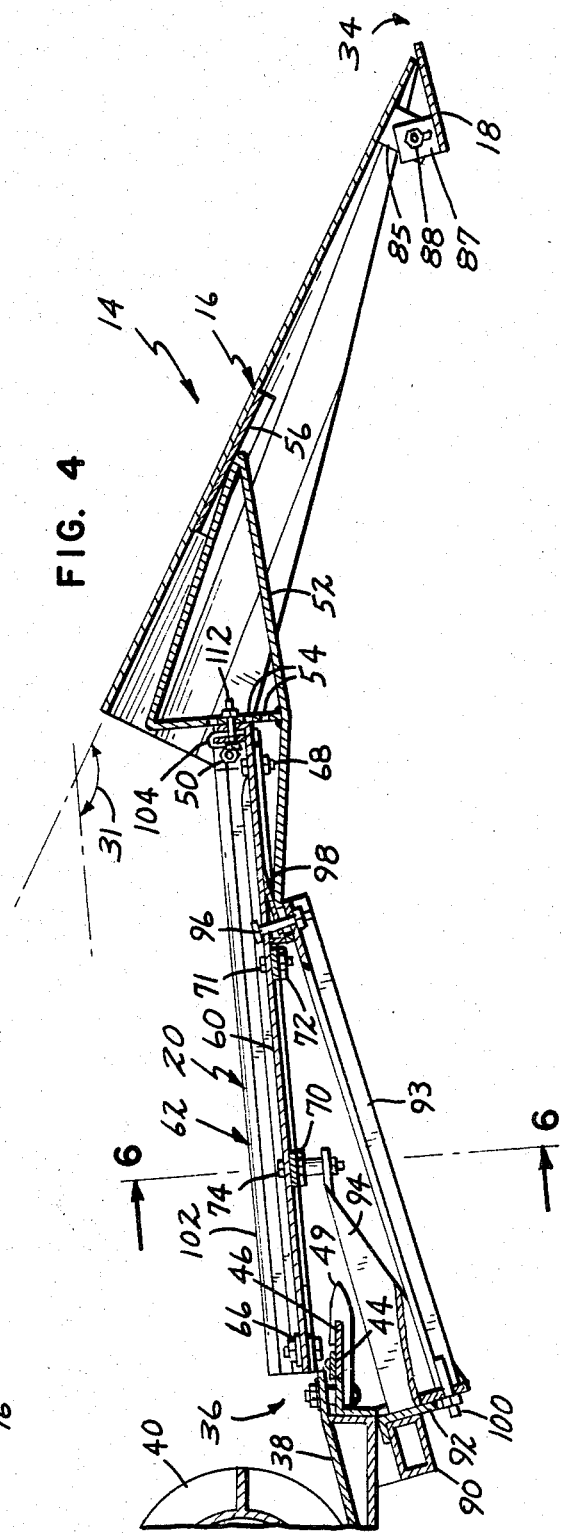

ADJUSTABLE CROP DIVIDER APPARATUS

FIELD OF THE INVENTION

The present invention relates generally to mechanical crop harvesters, and more particularly to adjustable crop dividers for mechanical crop harvesters.

BACKGROUND OF THE INVENTION

Mechanical harvesters have been found to be virtually an economic necessity for most medium to large scale farming operations. Relatively few crops are manually harvested, this being particularly true in industrialized areas of the world.

There are several types of mechanical harvesters, including combine harvesters. A combine harvester, as used herein, is a harvesting machine that heads, threshes, and cleans crops while moving over a field. Combine harvesters are often simply called "combines," and this terminology will be used herein. The present invention includes a crop divider for a mechanical crop harvester, but for the sake of brevity the discussion will center on a crop divider for a combine. Those skilled in the art of harvester use and design will appreciate that the present invention can be utilized with a variety of harvester configurations, however.

As mentioned above, the present invention pertains to crop dividers for mechanical harvesters. A crop divider, as used herein, is an apparatus which is positioned at the front of a harvester. The divider "divides" the crop by deflecting the plants' stalks as the harvesting machine proceeds forwardly through the field. The crop is thereby divided into discrete rows for efficient cutting and handling by the harvesting machine. This crop division is particularly important and troublesome when the crops are grain drilled and the crop density is high, though the invention is not limited to grain-drilled crops.

A crop divider can include a pointed "snout" at its frontmost end, the snout assisting in the dividing function described above. A crop divider can further include a sickle or knife, for cutting the stalks of the plants, and rotating paddles or the like to aid in the cutting and processing of the crop. A combine typically includes a platform to which a crop divider apparatus is operatively connected, the platform including an auger which inwardly propels the cut crop to a conveyor to remove the cut crop to another portion of the combine. As well known to those skilled in the art, the sickles and paddles mentioned above can be connected to the platform rather than the crop divider.

A crop divider preferably possesses a number of desirable characteristics. It should readily mount on existing harvesting equipment, e.g., a combine platform. A crop divider for use in conjunction with a combine, for example, should be simple in construction for ease of maintenance, yet be efficient so that crop yield can be maximized. A crop divider preferably efficiently accommodates a variety of crop conditions including bent, downed, brittle and very ripe crops. Importantly, a crop divider should also be useful for a variety of crops: otherwise, the operator of a machine that is employed to harvest a variety of crops would need to change crop dividers each time a different crop is harvested. The loss of time due to switching dividers and the need for more than one divider are undesirable.

One type of crop divider is represented by the "HEADSNATCHER" TM brand harvester attachment, manufactured by General Dryer Corporation of Clarkfield, Mn. This type of harvester attachment is mountable on a combine platform and facilitates the harvesting of sunflower seeds, for example. The crop divider includes a plurality of horizontally spaced pans that extend forwardly from the combine platform. The slots between the pans are straight; typically, the slots are 2.5" wide at the forward end of the pan and 2.5" wide at the rearward end of the pan. Furthermore, the slot configurations or shapes are fixed, not being readily adjustable by the operator of the combine.

Additionally, the "HEADSNATCHER" TM brand harvester attachment pans can optionally support non-adjustable pointed snouts at their front ends. That is, the angle between the snout and the pan is not adjustable.

The "HEADSNATCHER" TM brand crop divider and similar devices generally serve their intended purposes. Sunflower seeds, for example, can be efficiently harvested by such devices. The constant slot widths and rectangular configurations are compatible with the relatively spindly and occasionally brittle sunflower plant stalks and the non-adjustable snout is typically fixed in a position that properly engages most stalks. Furthermore, the narrow (e.g., 2.5") constant-width slots between pans allow the pans to catch many of the seeds and heads that would otherwise be lost, thus increasing the harvest yield. Yield loss due to "shattering" of dry plants is minimized. Straight slots have also been found to be useful for corn, amaranth, lupines, and beans.

The "HEADSNATCHER" TM type of crop divider is typically quite efficient for select crops, is relatively inexpensive, and is mountable to existing combine platforms. Thus, this type of crop divider is very useful. Such dividers possess drawbacks, however. For one, the fixed rearward and forward slot widths limit the types of plants that can be efficiently harvested. Bushier plants, e.g., milo or grain sorghum, are not readily guided by the constant-width, relatively narrow slots. The bushier plants become jammed in the straight slots if the slots are too narrow, or seeds fall between the pans if the slots are too wide. Also, the fixed snouts of the "HEADSNATCHER" TM type of crop divider are not vertically-adjustable and therefore do not consistently pick up bent and downed plants under varying conditions.

Another type of crop divider similar to the "HEADSNATCHER" TM apparatus discussed above includes pans that define tapered or V-shaped slots. The forward portions of the pans are narrower than the rearward portions. Thus, the slots are wider toward the forward portions of the pans and narrower toward the rearward portions of the pans. Such slots are conceptually compatible with bushier plants such as milo, but are not optimum when used for harvesting sunflower seeds, for example. A tapered slot allows many sunflower seeds and heads to fall through the slots and to the ground, thus reducing yield.

The present invention is directed to the drawbacks possessed by the prior art devices. Particularly, the present invention includes a crop divider that defines slots that are adjustable so that a variety of plants can be effectively harvested. In one embodiment, the forward slot width is adjustable to enable the slot configuration to be variable between straight and V-shaped so that a single device can be used to harvest, for example, sunflower seeds and milo. In another embodiment of the present invention, the forward and rearward slot widths can be varied. Thus even a greater variety of plants can be harvested by a harveting machine incorporating such a device.

The present invention also includes, in one embodiment, a vertically-adjustable snout so that the snout may be selectively angled downward to pick up bent and downed plants.

SUMMARY OF THE INVENTION

Accordingly, the present invention includes a crop divider for harvesting apparatus wherein the crop divider includes a body, means for adjusting the crop divider width, means for operatively connecting the width adjusting means to the crop divider body and means for operatively connecting the crop divider to the harvesting apparatus. The body preferably includes means for operatively connecting to the harvesting apparatus, and the width adjusting means preferably includes a left side section and a right side section that can be moved toward one another to narrow the crop divider and moved away from one another to widen the crop divider; slots formed by like crop dividers are thereby widened and narrowed, respectively. The side sections are preferably pivotally connected to the body, and when the side sections are pivoted toward one another, a V-shaped slot is formed by like crop dividers, the forward width of the slot being larger than the rearward width of the slot.

One embodiment of the crop divider of the present invention can further include a snout. The snout is preferably hingedly connected to the side sections, the snout width being adjustable to accomodate changes in the divider width, and the crop divider includes limiting means to limit the lowermost position of the snout, i.e. means to limit the minimum included angle between a body longitudinal axis and a snout longitudinal axis, the longitudinal axes being substantially coplanar, in an adjustable fashion. A vertically-adjustable snout support bracket operatively attached to the body and extending beneath the associated snout functions as the limiting means in one embodiment.

The invention further includes a harvesting apparatus that includes a plurality of substantially parallel crop dividers, wherein the crop dividers define slots having adjustable widths. Embodiments of the harvesting apparatus include crop dividers that possess characteristics of the embodiments of crop dividers discussed above. That is, the crop dividers preferably include side sections which are pivotally connected to a crop divider body. Also, the side sections preferably include sides or uprights which extend substantially perpendicular to planar pan extensions so that, for example, a quantity of sunflower seeds that have fallen into the pan can be carried to a combine's auger by the crop divider apparatus.

The harvesting apparatus also preferably includes a plurality of snouts. Each snout is attached proximate to the forward end of an adjustable pan, and each snout is vertically adjustable according to crop type and condition and width-adjustable to correspond to changes in divider width and slot width.

BRIEF DESCRIPTION OF THE DRAWINGS

FIG. 2 is a top plan view of a plurality of crop divider assemblies of the combine attachment shown in FIG. 1.

FIG. 3 is a bottom plan view of a crop divider assembly of FIG. 1.

FIG. 4 is a side cross-sectional view of one of the crop divider assemblies of FIG. 2, taken along 4—4.

DETAILED DESCRIPTION OF THE INVENTION

Figure 1:
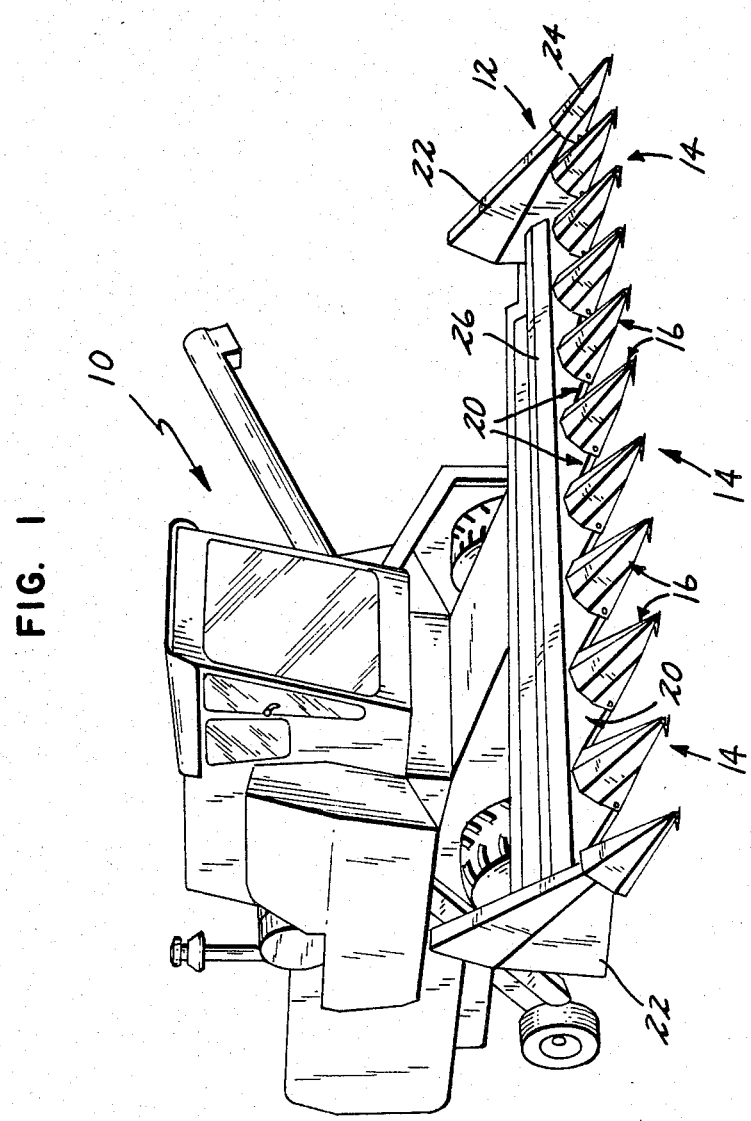
FIG. 1 is a front and side perspective view of a combine having a combine attachment constructed according to the principles of the present invention, the combine attachment including a plurality of crop divider assemblies.

In the attached Figures, wherein like numerals represent like components and assemblies throughout, FIG. 1 shows a perspective view of a combine 10 having a combine attachment 12. The combine attachment 12 is an embodiment of the present invention, though it should be noted that the invention is not limited to combine attachments. That is, one embodiment of the present invention is an apparatus for dividing crops, wherein the apparatus has an adjustable width and a plurality of such crop dividers form slots having variable widths. Variations of the combine attachment 12 could be carried by other types of harvesting equipment, for example tractors.

The combine attachment 12 includes a plurality of crop divider assemblies 14 horizontally spaced across the forward portion of the combine attachment 12. Each of the crop divider assemblies 14 preferably includes a snout 16 having a shoe 18 and a divider pan 20. The combine attachment 12 further includes a pair of end dividers 22, each of the end dividers 22 including an end divider snout 24.

A bumper 26 horizontally spans the width of the combine attachment 12 and functions to deflect the stalks of the harvested crop in a particular manner as well known in the art of harvester design.

The combine 10 and combine attachment 12 are generally used in the following way: The combine 10 is forwardly guided through a field that is to be harvested and the combine attachment 12 serves to divide the crop into discrete rows in the slots between the crop divider assemblies 14. At the rearward ends of the slots the crops are cut by a sickle or knife and ultimately conveyed into the combine 10 for additional processing or storage. The snouts 16 are vertically adjustable, as shown in FIG. 4, and thereby can be used to pick up and divide bent and broken stalks. The end dividers 22 and end divider snouts 24 prevent crops from escaping around the outside edges of the combine attachment 12 in order to maximize the harvested yield.

The combine attachment 12 is attached to combine 10 according to well-known techniques. Chains (not shown) are very often used to interconnect the attachment 12 and the combine 10. Hydraulic rams (not shown) within the combine 10 permit the combine attachment 12 to be raised and lowered to optimize the performance of the attachment 12 and combine 10, and to more easily allow the attachment and detachment of the combine attachment 12.

The shoes 18 at the ends of snouts 16 serve to protect the snouts 16 from burrowing into the soil and thereby damaging themselves and the combine attachment 12 and combine 10. The shoes 18 deflect the associated snouts 16 upward when the shoes 18 make contact with the soil. The shoes 18 are themselves adjustable as described below.

FIG. 2 shows a top plan view of four of the crop divider assemblies 14 of the combine attachment 12. As shown, the crop divider assemblies 14 are generally positioned in spaced and parallel relationship with respect to one another. That is, pan longitudinal axes 30 are generally in parallel alignment. Each of the divider pans 20 is generally symmetrically disposed about the associated pan longitudinal axis 30 as shown in FIG. 2. It should be noted that the pan longitudinal axes 30 can alternatively be termed pan body longitudinal axes 30 as further discussed below.

Each of the snouts 16 likewise includes a snout longitudinal axis 32. The snout longitudinal axes 32, as herein defined, pass through the topmost ridges of the snouts 16, the ridges being best seen in FIG. 6. Preferably, the vertically-adjustable snouts 16 are adjusted so that their longitudinal axes 32 are substantially parallel and coplanar. Each pan longitudinal axis 30 and the associated snout longitudinal axis 32 also preferably lie in a longitudinal plane, regardless of the vertical adjustment of the snout 16. The longitudinal plane of each crop divider assembly 14 passes through the pan longitudinal axis 30 and associated snout longitudinal axis 32 and is generally perpendicular to the associated divider pan 20. As shown in FIG. 4, the longitudinal axes 30 and 32 preferably intercept and define an included angle 31. In FIG. 4, a line parallel to pan longitudinal axis 30 is utilized to form angle 31 for the sake of clarity. The longitudinal planes of the crop divider assemblies 14 are substantially parallel.

The crop divider assemblies 14 include forward ends 34 and rearward ends 36. The rearward ends 36 are positioned so that they are proximate to an auger casing 38 which encases a rotating auger 40. The auger casing 38 and auger 40 are components of the combine 10 and are not parts of the combine attachment 12. Also included in combine 10 is a sickle assembly 42. The sickle assembly 42 includes a sickle bar 44 (shown in FIG. 4) and sharpened sickle sections 46 riveted to the sickle bar 44 by rivets 48. The sickle assembly 42 also includes stationery knife guards 49 which form slits which guide the sickle sections 46 as they are reciprocally driven by a mechanical power source within the combine 10. The knife guards 49 are typically cast iron and are well-known components of harvesting equipment.

As shown in FIG. 2, the crop divider assemblies 14 have variable widths. The divider assemblies 14 as shown in solid line FIG. 2 are at their minimum widths. The dashed lines in FIG. 2 represent the maximum widths. It can be seen that the slots formed by the divider assemblies 14 necessarily vary in width as the widths of the crop dividers 14 are varied. Thus, when the crop divider assemblies 14 are in their narrowmost configurations, the slots therebetween are in their widest states. Likewise, when the crop divider assemblies 14 are widest, the slots are at their narrowest. As further discussed below, this variable slot width is advantageous in that a variety of plants can be efficiently harvested.

Generally, the crop divider assemblies 14 in conjunction with the combine attachment 12 function as follows: the forward ends 34 of the crop divider assemblies 14 divide the crop to be harvested into discrete rows which pass through the slots formed by the spaced and generally parallel crop divider assemblies 14.

The stalks of the crops are cut by the sickle assembly 42 as well known in the art of combine harvesting. The sickle sections 46 cooperate with knife guards 49 in scissor-like fashion to cut the stalks, thus allowing the cut crops to fall into the auger casing 38 to be augered by the auger 40 to a central location and ultimately conveyed up into the combine 10.

During operation of the combine 10 in combination with the combine attachment 12, the divider pans 20 are adjusted so that they tilt upwards at a slight angle as better shown in FIG. 4. Any sunflower seeds or heads, for example, that might fall into the slightly-inclined divider pans 20, are conveyed by vibration and the force of gravity into the auger casing 38.

The snouts 16 are vertically adjustable to accommodate different types of crops and to pick up bent and downed crops. The snouts 16 are hingedly connected to the divider pans 20 and pivot about a pair of snout hinge bolts 50. The snouts 16, as shown in FIG. 4, can freely move upward but are constrained by snout support brackets 52 on their undersides to establish lowermost positions for the snouts 16. The snout support brackets 52 are vertically adjustable as shown in FIG. 4. They each include a plurality of vertically-aligned vertical adjustment holes 54 that permit the snout support bracket 52 to be vertically adjusted. The forward end of each snout support bracket 52 supports a bearing slide 56 which is connected to the snout 16. The bearing slide 56 is formed from sheet metal, preferably steel, of a gauge similar to that used to form the snouts 16. It can clearly be seen in FIG. 4 that the snout 16 can freely move upwards but is constrained by the snout support bracket 52 to a particular lowermost position. That is, the snout support bracket 52 establishes the minimum included angle 31 between the pan longitudinal axis 30 and snout longitudinal axis 32 in the longitudinal plane of each crop divider assembly 14 as defined above. The snout 16 and the shoe 18 are thus carried generally above the ground surface and the shoe 18 only causes the snout 16 to move upward in the event that the shoe 18 strikes the ground plane.

FIG. 3 shows a bottom plan view of one of the crop divider assemblies 14. The divider pan 20 includes three basic co-planar portions: a pan body 60, a pan right side section 62 and a pan left side section 64. The body 60 and side sections 62 and 64 are preferably formed from medium gauge sheet steel using techniques well known in the art of sheet metal fabrication. The body 60 and side sections 62 and 64 are interconnected by a pair of pan hinge bolts 66 at the rearwrd end 36 of divider assembly 14 and a pair of forward pan adjustment bolts 68 at the forward end of the divider pan 20. The pan or pan body longitudinal axis 30 is shown in FIG. 3. The pan body 60 is generally disposed about the longitudinal axis 30.

Still referring to FIG. 3, a rearward pan guide 70 and a forward pan guide 72 are bolted to the pan body 60 and act to hold the body 60 and side sections 62 and 64 in co-planar alignment. The rearward pan guide 70 is shown in cross-section in FIG. 6 and it can be seen that it allows the pan side sections 62 and 64 to slidably expand and contract relative to the pan longitudinal axis 30. The rearward pan guide 70 is bolted to the pan body 60 through the use of rearward pan support bolts 74. Likewise, the forward pan guide 72 guides the side sections 62 and 64 and holds the side sections 62 and 64 in cooperative alignment with the pan body 60 as the side sections 62 and 64 are adjusted to narrow or widen the divider pan 20. The forward pan guide 72 is bolted to the pan body 60 by a pair of forward pan guide bolts 71.

As shown by rearward arrows 76 and forward arrows 78 in FIG. 3, the side sections 62 and 64 are adjustable inward and outward. The side sections 62 and 64 can pivot about the pan hinge bolts 66. Additionally, the pan hinge bolts 66 can be removed so that the rearward portions of side sections 62 and 64 can be adjusted relative to the pan body 60. A plurality of rearward holes 80 in the side sections 62 and 64 can be selectively aligned with corresponding holes in the pan body 60 to effect this adjustment. The pan guides 70 and 72 hold the side sections 62 and 64 and pan body 60 together as this adjustment is made. The forward width of the divider pan 20 can also be changed as indicated by the forward arrows 78. With the pan hinge bolts 66 functioning as pivots for the side sections 62 and 64, and once the forward pan adjustment bolts 68 are removed, the side sections 62 and 64 can be pivoted so that the forward width of the divider pan 20 is increased or decreased depending on the desired slot configuration between like crop divider assemblies 14. Thus, the rearward width and forward width of the divider pan 20 as constructed according to the principles of the present invention are adjustable so that the widths of the slots can be selectively adjusted along the pan or pan body longitudinal axes 30.

Figure 6:
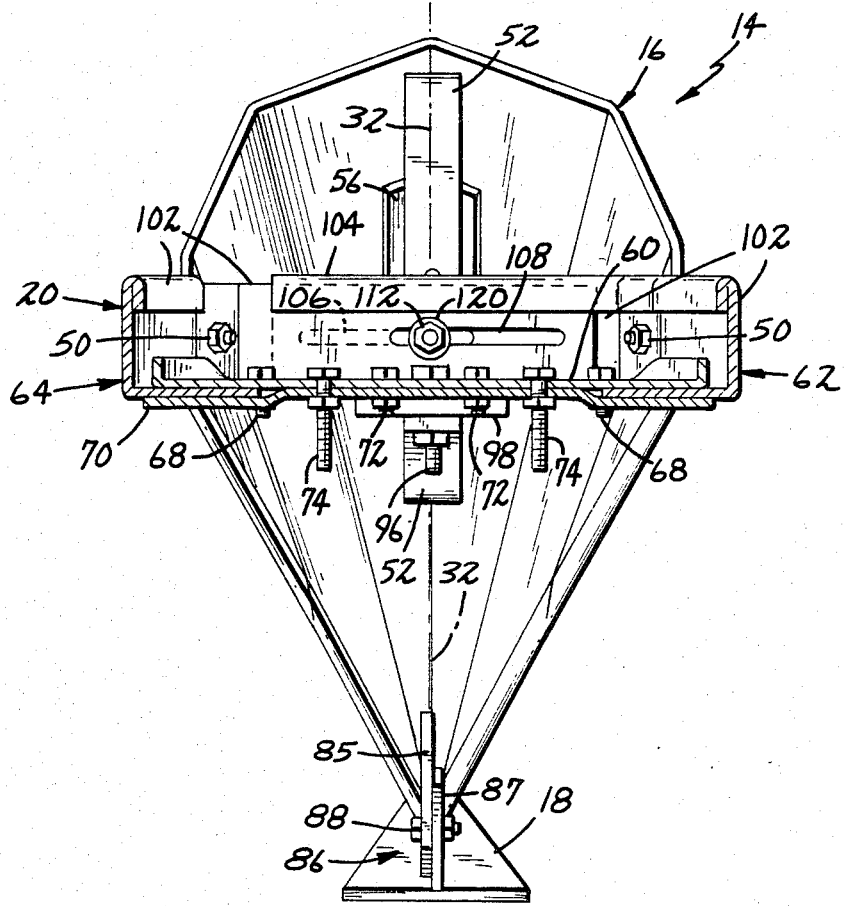
FIG. 6 is an end elevational cross-sectional view of the crop divider assembly of FIG. 4, taken along 6—6.

The snouts 16 are preferably formed of sheet steel and bent as shown in the figures, particularly FIG. 6. Each snout 16 is hingedly attached to its associated divider pan 20 by a pair of snout hinge bolts 50 which allow the snout to freely pivot upwards as described above. The snout 16 is so designed to enable it to be vertically adjusted to erect and align bent and downed crops. The shoe 18 at the forward end 34 of the crop divider assembly 14 acts to force the snout 16 upwards in the event that an irregularity in the surface of the ground is encountered during the harvesting operation. The forward end of the shoe 18 is preferably welded to the forward end of the snout 16 and is connected to a shoe adjustment bracket 86 at its rearward end. The shoe adjustment bracket 86 permits the shoe 18 to be angularly adjusted with respect to the longitudinal axis 32 of the snout 16. To that end, a first portion 85 of the shoe adjustment bracket 86 is welded to the snout 16, and this portion includes a hole through which shoe adjustment bolt 88 protrudes. The shoe adjustment bolt 88 also protrudes through a slot in a second portion 87 of the shoe adjustment bracket 86 which is attached to the shoe 18. The shoe adjustment bolt 88 can be loosened to permit the shoe 18 to be deformed into the desirable configuration.

FIG. 4 shows a means by which the crop divider assembly 14 can be attached to the platform of the combine 10. Each of the crop divider assemblies 14 is attached to a base channel 90, a steel rectangular channel, and the base channel 90 is typically attached to the combine 10 through the use of chains or the like (not shown) as well known to those skilled in the art of combine attachment design. Attached to the base channel 90 is a base plate 92 which is made preferably of steel angle iron and provides a mounting surface for components that support the crop divider assemblies 14.

Cantilevered from the base plate 92 are sheet metal fins 94 which, at their forward ends, support the pan bodies 60 approximately midway between the rearward ends and the forward ends of the pan bodies 60. A pair of rearward pan support bolts 74 connect each pan body 60 to its associated fin 94. The fin 94 may be connected to the base plate 92 in any convenient fashion, including welding, and the fin 94 may be a weldment or fabricated using sheet metal that is appropriately formed. The fin 94 includes a fin rear plate 95 that is adjacent to the base plate 92.

The fin rear plate 95 supports a pan support bracket 93 which is connected by a forward bracket bolt 96 to the pan body 60. A brace angle 98, a steel weldment or the like having a longitudinally-oriented slot, includes a surface that conforms to surfaces of the snout support bracket 52 and pan support bracket 93. The forward bracket bolt 96 thus interconnects the pan body 60, the snout support bracket 52 and the pan support bracket 52. The forward bracket bolt 96 may be loosened to enable the crop divider assembly 14 to be longitudinally adjusted so that its rearward end 36 can come into proximity with the auger casing 38 as shown in FIG. 4. A rearward bracket bolt 100 connects the pan support bracket 52 to the fin rear plate 95.

FIG. 4 also shows that the pan right side section 62 and pan left side section 64 include pan extension uprights 102 that provide the divider pan 20 with the capacity to hold a large quantity of sunflower seeds, for example, and allow the divider pan 20 to transport these seeds to the collecting auger 40 for further processing. As discussed above and as shown in FIG. 4, the divider pan 20 is angled slightly upwards to facilitate this process. As shown in FIG. 6, the pan extension uprights 102 include a rolled upper edge so that the plant stalks are smoothly guided and not cut by the crop divider assemblies 14.

Figure 5:
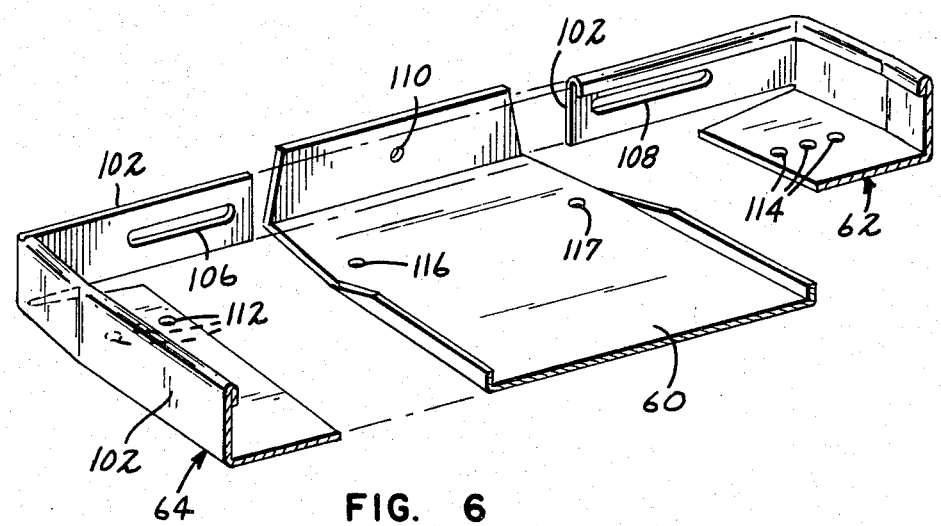
FIG. 5 is an exploded sectional perspective view of the divider pan of the crop divider assembly of FIG. 4.

FIG. 5 shows an exploded perspective view of the forward portion of the divider pan 20. The pan body 60 and pan side sections 64 and 62 are preferably formed of sheet steel stock according to well-known metal forming techniques. The pan extension uprights 102 of the side sections 62 and 64 are rolled as described above. The forwardmost pan extension upright 102 of pan right side section 62 includes a rolled upper edge 104 that slidably accommodates the forwardmost pan extension upright 102 of pan left side section 64 as shown in FIG. 5. The pan left side section 64 must therefore be fabricated so that it is slightly shorter than the pan right side section 62 along the longitudinal axis 30 of the divider pan 20. The forwardmost upright 102 of pan left side section 64 may thereby slidably engage the forwardmost upright 102 of pan right side section 62.

A left slot 106 in left side section 64 and a right slot 108 in right side section 62 are aligned when the side sections 62 and 64 interleave as discussed above. The slots 106 and 108 also align with a vertical adjustment bolt hole 110 in the pan body 60. The pan side sections 62 and 64 may therefore slide toward one another and away from one another to narrow and widen the divider pan assembly 20, respectively. A vertical adjustment bolt 112, as shown in FIG. 4, pulls the forwardmost uprights 102 of the side sections 62 and 64 into frictional contact to limit their relative movement.

The side sections 62 and 64 are even more effectively locked into position by bolting the side sections 62 and 64 to the pan body 60. A plurality of forward left side holes 112 in pan left side section 64 may be selectively aligned with a corresponding left forward body hole 116 in the pan body 60, as shown in FIG. 5. Likewise, a plurality of forward right side holes 114 can be selectively aligned with a right forward body hole 117 in the pan body 60. The forward pan adjustment bolts 68, as shown in FIG. 3, are placed through the aligned holes 112, 116 and 114, 117, respectively, to maintain the forward width of the divider pan 20. The forward width of the divider pan 20 is thereby adjustable as indicated by the forward arrows 78 shown in FIG. 3. As shown in FIG. 6, an end elevational cross-sectional view of the crop divider assembly of FIG. 4, a vertical adjustment washer 120 is preferably utilized to more smoothly accommodate the forward width adjustment of the divider pan 20.

FIG. 6 also clearly shows the preferred cross-sectional shape of the snout 16. The snout 16 includes a series of ridges that provide longitudinal bending resistance and it allow the snout 16 to laterally flex to accommodate the forward width adjustment of the divider pan assembly 20. The snout longitudinal axis 32 passes through the upper most ridge in this embodiment.

The operation of the combine attachment 12 in combination with the combine 10 can now be summarized. With the combine attachment 12 lying on the ground, the combine 10 is driven forwardly into engagement with the combine attachment 12 and the platform of the combine 10 is hydraulically positioned. The combine attachment 12 is attached to the combine 10 using chains or the like as is well-known in the art of combine attachment design and operation. The platform or base of the combine 10, including the combine attachment 12, is then hydraulically positioned so that the divider pans 20 are slightly inclined as shown in FIG. 4.

The vertical adjustment bolts 112 of the crop divider assemblies 14 are loosened so that the forward widths of the divider pans 20 can be properly adjusted. The forward pan adjustment bolts 68 are removed and the forward widths adjusted to best accommodate the type of crop to be harvested. It is perceived that a bushier crop such as milo is more efficiently harvested using a tapered slot, and therefore the forward widths of the divider pans 20 are narrowed relative to the rearward widths of the divider pans 20 thereby creating V-shaped slots between adjacent crop divider assemblies 14. The pan hinge bolts 66 are preferably loosened during this operation to enable the side sections 62 and 64 to be easily pivoted into proper position. Once the side sections 62 and 64 are properly positioned, the forward pan adjustment bolts 68 are reinserted and their associated nuts appropriately tightened.

It should be emphasized that the divider pans 20 can be efficiently utilized in the absence of associated snouts 16. However, in the event that snouts 16 are used, the vertical adjustment bolts 112 can be removed to enable the vertical adjustment of the snout support brackets 52 to adjust the minimum included angles 31 between the longitudinal axes of the divider pans 20 and the snouts 16. Thus, the snouts 16 can freely move upward but their lowermost positions are determined by the associated support brackets 52 in contact with the associated bearing slides 56 that are attached to the undersides of snouts 16.

It should be noted that, in the event that snouts 16 are utilized, the forward widths of divider pans 20 can be adjusted without disconnecting the snouts 16 from the divider pans 20. The snouts 16, constructed of relatively light gauge sheet metal, will flex to accommodate changes in the forward widths of the divider pans 20, as described above.

It should also be noted that in the event that the rearward widths of the divider pans 20 require adjustment, the pan hinge bolts 66 can be removed to allow the selective alignment of new rearward holes 80 with corresponding holes in the associated pan bodies 60. Thus, both the rearward and forward widths of the divider pans 20 can be adjusted to most efficiently harvest a large variety of crops.

Once the initial adjustments are made on the divider pans 20 and the snouts 16, the combine 10 and combine attachment 12 can be utilized to harvest the crop. When another crop, having different characteristics, is to be harvested adjustment of the widths of the divider pans 20 and of the lowermost positions of the snouts 16 can be easily and quickly made without detaching the combine attachment 12 from the combine 10.

The shoes 18 can also be adjusted to best protect the snouts 16 from burrowing into the soil. The snout adjustment bolts 88 can be loosened, the shoes 18 properly deformed, and the bolts 88 tightened.

Numerous characteristics and advantages of the invention have been set forth in the foregoing description. It will be understood, of course, that this disclosure is, in many respects, only illustrative. Changes may be made in details, particularly in matters of shape, size, and arrangement of parts without exceeding the scope of the invention. The scope of the invention is defined in the language in which the appended claims are expressed.

I claim:

1. A crop harvesting apparatus comprising a base and a plurality of crop dividers, each of said crop dividers having a longitudinal plane, a rearward width and a forward width, and each of said crop dividers comprising:
   (a) a body;
   (b) means for adjusting the rearward width of said crop divider and independently adjusting the forward width of said crop divider;
   (c) means for operatively connecting said width adjusting means to said body; and
   (d) means for operatively connecting said crop divider to said base, wherein said longtidunal planes of said crop dividers are substantially parallel and said crop dividers form a plurality of slots therebetween, wherein the forward and rearward widths and the configuration of each of said slots are adjustable.

2. The harvesting apparatus as recited in claim 1, wherein each of said bodies comprises means for operatively connecting to said base, and each of said width adjusting means comprises an operative pair comprising a left side section and a right side section, wherein adjustment of said operative pair of said side sections toward or away from one another narrows or widens the width of said associated crop divider and consequently widens or narrows said associated slots, respectively.

3. The harvesting apparatus as recited in claim 2, wherein each of said bodies comprises a substantially planar pan, each of said side sections comprises a substantially planar pan extension, and each of said pan extensions is substantially co-planar with said associated pan.

4. The harvesting apparatus as recited in claim 3, wherein each of said side sections further comprises a pan extension upright substantially perpendicular to said associated pan extension.

5. The harvesting apparatus as recited in claim 4, wherein each of said bodies comprises a rearward portion and a forward portion, said rearward portions being proximate to said base and each of said bodies having a longitudinal axis lying substantially in said associated longitudinal plane.

6. The harvesting apparatus as recited in claim 5, each of said crop dividers further comprising a snout having a longitudinal axis substantially lying in said associated longitudinal plane, each of said snouts being adjustably connected to said associated side sections proximate to said forward portion of said associated body, wherein the width of each of said snouts is adjustable to accommodate adjustment of said associated operative pair of said side sections.

7. The harvesting apparatus as recited in claim 6, wherein each of said snouts is hingedly connected to said associated side sections about a snout pivot axis substantially perpendicular to said associated longitudinal plane, and each of said crop dividers further comprises means for limiting the lowermost position of said associated snout, wherein said limiting means operatively engages said associated snout to establish a minimum included angle between said associated longitudinal axes.

8. The harvesting apparatus as recited in claim 7, wherein each of said limiting means comprises a snout support bracket, said snout support bracket being operatively connected to said associated body and extending beneath said associated snout.

9. The harvesting apparatus as recited in claim 8, wherein each of said snout support brackets is vertically adjustable in said associated longitudinal plane, whereby said minimum included angle is adjustable.

10. A crop harvesting attachment for use in combination with crop harvesting apparatus, said crop harvesting attachment comprising:
(a) a plurality of crop divider pans, said divider pans having forward and rearward portions and said divider pans having longitudinal planes and forward and rearward widths;
(b) means for supporting said divider pans wherein their rearward portions are proximate to the crop harvesting apparatus and to thereby position said longitudinal planes of said pans in a generally parallel alignment, each of said pans being displaced from its adjacent pans to thereby create slots between adjacent divider pans;
(c) means for independently adjusting the forward and rearward widths of said divider pans to thereby adjust the slot forward and rearward widths and configurations; and
(d) snouts paired with and carried by said divider pans proximate to said forward portions of said associated divider pans, each snout covering at least the forward portion of its associated divider pan and being adjustable to accommodate changes in the forward width of said associated divider pan.

11. The crop harvesting attachment as recited in claim 10, wherein the width of said snout is adjustable by flexing to allow it to embrace its associated divider pan.

12. An improved method of harvesting crops in which the crop is directed into at least one constrained guide zone where the crop can be harvested mechanically, the improvement which comprises:
(a) providing a mechanical harvesting device having at least one guide zone and including means for adjusting the width and configuration of the guide zone;
(b) selecting a width and configuration for the guide zone that is effective with the crop to be harvested;
(c) adjusting the width and configuration of the guide zone to the selected width and configuration;
(d) moving the harvesting device through the crop to thereby receive the crop into the guide zone; and
(e) harvesting said crop.

* * * * *